(12) United States Patent
Desanti

(10) Patent No.: US 7,095,738 B1
(45) Date of Patent: Aug. 22, 2006

(54) SYSTEM AND METHOD FOR DERIVING IPV6 SCOPE IDENTIFIERS AND FOR MAPPING THE IDENTIFIERS INTO IPV6 ADDRESSES

(75) Inventor: Claudio Desanti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1008 days.

(21) Appl. No.: 10/140,485

(22) Filed: May 7, 2002

(51) Int. Cl.
H04L 12/28 (2006.01)
H04L 12/56 (2006.01)

(52) U.S. Cl. ...................... 370/389; 370/400; 709/238

(58) Field of Classification Search ..................... None
See application file for complete search history.

(56) References Cited

U.S. PATENT DOCUMENTS

| | | | |
|---|---|---|---|
| 5,394,402 A | 2/1995 | Ross | |
| 5,742,604 A | 4/1998 | Edsall et al. | |
| 5,964,841 A | 10/1999 | Rekhter | |
| 6,331,983 B1 * | 12/2001 | Haggerty et al. | 370/400 |
| 6,339,595 B1 | 1/2002 | Rekhter et al. | |
| 6,389,506 B1 | 5/2002 | Ross et al. | |
| 6,711,171 B1 * | 3/2004 | Dobbins et al. | 370/400 |
| 6,839,348 B1 * | 1/2005 | Tang et al. | 370/390 |
| 6,847,620 B1 * | 1/2005 | Meier | 370/328 |
| 6,996,102 B1 * | 2/2006 | Pegrum et al. | 370/390 |
| 2002/0009083 A1 * | 1/2002 | Ambe et al. | 370/390 |
| 2003/0165140 A1 * | 9/2003 | Tang et al. | 370/393 |

OTHER PUBLICATIONS

Hinden and Deering, "IPv6 Multicast Assress Assignments," Network Working Group, Jul. 1998, Request for Comments: 2375.

Hinden and Deering, "IP Version 6 Addressing Architecture," Network Working Group, Jul. 1998, Request for Comment: 2373.

Deering, et al., "IPv6 Scoped Address Architecture," IPNGWG Working Group Internet Draft, Nov. 2001.

(Continued)

Primary Examiner—Bob A. Phunkulh
(74) Attorney, Agent, or Firm—Cesari and McKenna LLP

(57) ABSTRACT

A system and method for use at an intermediate network device employs Virtual Local Area Network (VLAN) designations as Internet Protocol version 6 (IPv6) link identifiers, and maps VLAN designations to IPv6 site identifiers (IDs). The system also generates a compacted look-up address based on the destination address specified within a received network message, such as an IPv6 packet. For a network message having a link-local unicast destination address, the VLAN ID associated with the port on which the message was received is encoded within the corresponding look-up address. For a network message having a site-local unicast address, the VLAN ID associated with the port on which the message was received is used to derive a site ID which is then encoded within the corresponding look-up address. For a network message having a multicast destination address, if the address's scope value is between hexadecimal "2" and "4" inclusive, the VLAN ID associated with the port on which the message was received is encoded within the corresponding look-up address. If the scope value is between hexadecimal "5" and "D", inclusive, the VLAN ID associated with the port on which the message was received is used to derive a site ID which is then encoded within the corresponding look-up address. The look-up addresses are applied to a forwarding information base (FIB) to derive the outbound interface(s) from which the message is to be forwarded.

26 Claims, 10 Drawing Sheets

OTHER PUBLICATIONS

IPv6, http://www.e.kth.se/~e92_ubj/exjobb/html/IPv6.html.

IPv6 for Cisco IOS Software, File 1 of 3: Overview.

Baker, F., "Requirements for IP Version 4 Routers," Network Working Group, Jun. 1995, Request for Comments: 1812.

Deering and Hinden, "Internet Protocol, Version 6 (IPv6) Specification," Network Working Group, Dec. 1995, Request for Comments: 1883.

Hinden, et al., "An IPv6 Aggregatagble Global Unicast Address Format," Network Working Group, Jul. 1998, Request for Comments: 2374.

Newman, et al., "Ipsilon Flow Management Protocol Specification for IPv4 Version 1.0," Network Working Group, May 1996, Request for Comment: 1953.

Rekhter and Li, "An Architecture for IPv6 Unicast Address Allocation," Network Working Group, Dec. 1995, Request for Comments: 1887.

Catalyst 2820 Series and Catalyst 1900 Series Enterprise Edition Software Configuration Guide, Chapter 2: Virtual LANs, pp. 2-1 through 2-49.

"Draft Standard P802.1Q/D10 IEEE Standards for Local and Metropolitan Area Networks: Virtual Bridged Local Area Networks," Mar. 22, 1998, Institute of Electrical and Electronics Engineers, Inc., New York.

"White Paper, Catalyst 8500 CSR Architecture," Cisco Systems, Inc., Jul. 2, 2000.

Ran Atkinson, "(IPng 1061) Forwarding Link-local Addresses," Cisco Systems, Inc., Jan. 9, 1996.

Brian Haberman, "Routing of Site-Scoped Addresses in the Internet Protocol Version 6 (IPv6)," IBM, Internet Draft, Apr. 1998.

Cisco Express Forwarding Feature Module, Cisco Systems, Inc., 1998.

White Paper: Cisco Express Forwarding (CEF), Cisco Systems, Inc., Jul. 3, 2000.

Overview of Routing Between Virtual LANs, Cisco Systems, Inc., 1997.

Next Generation IP, Morgan Kaufmann Publishers, 1997.

* cited by examiner

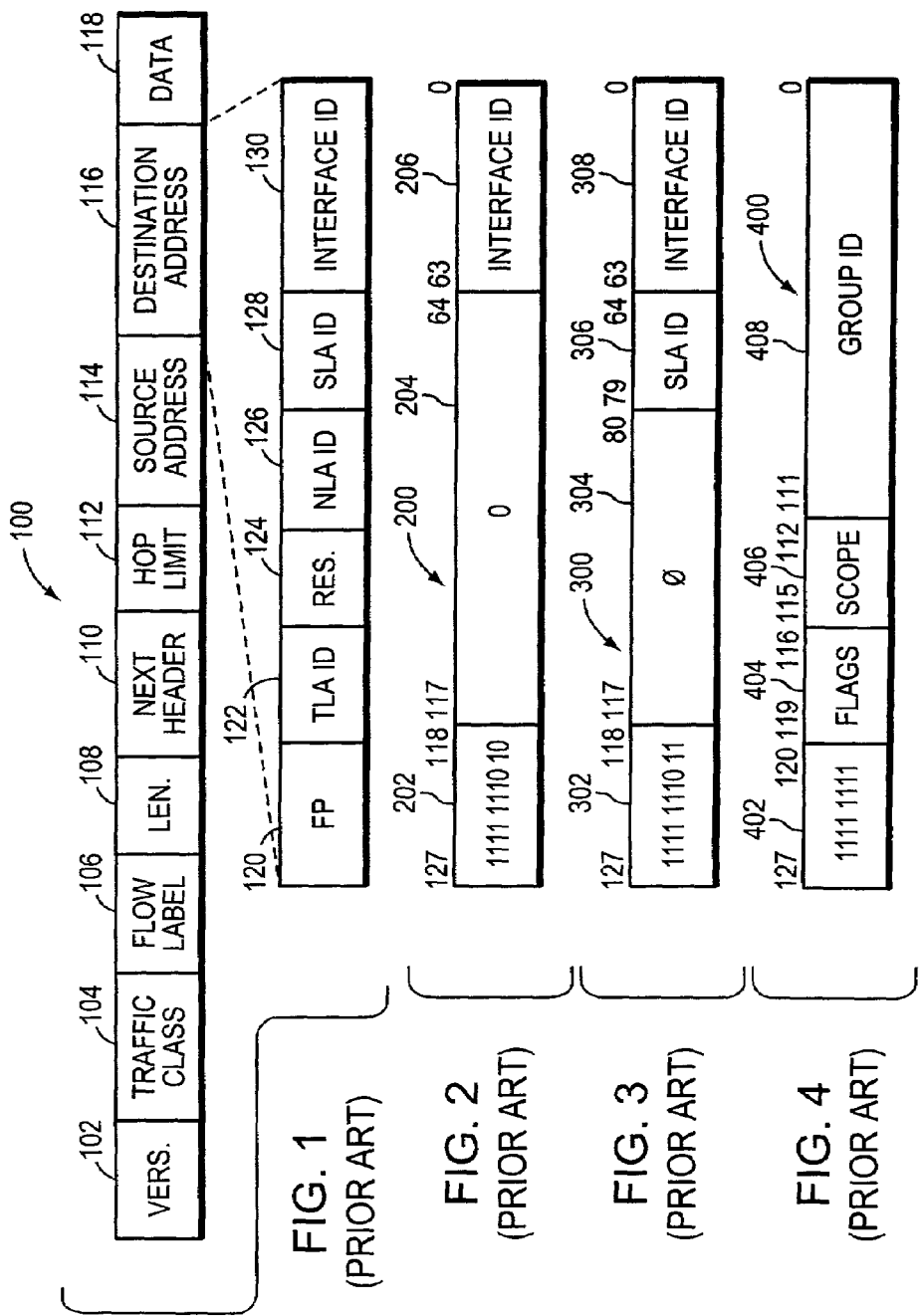

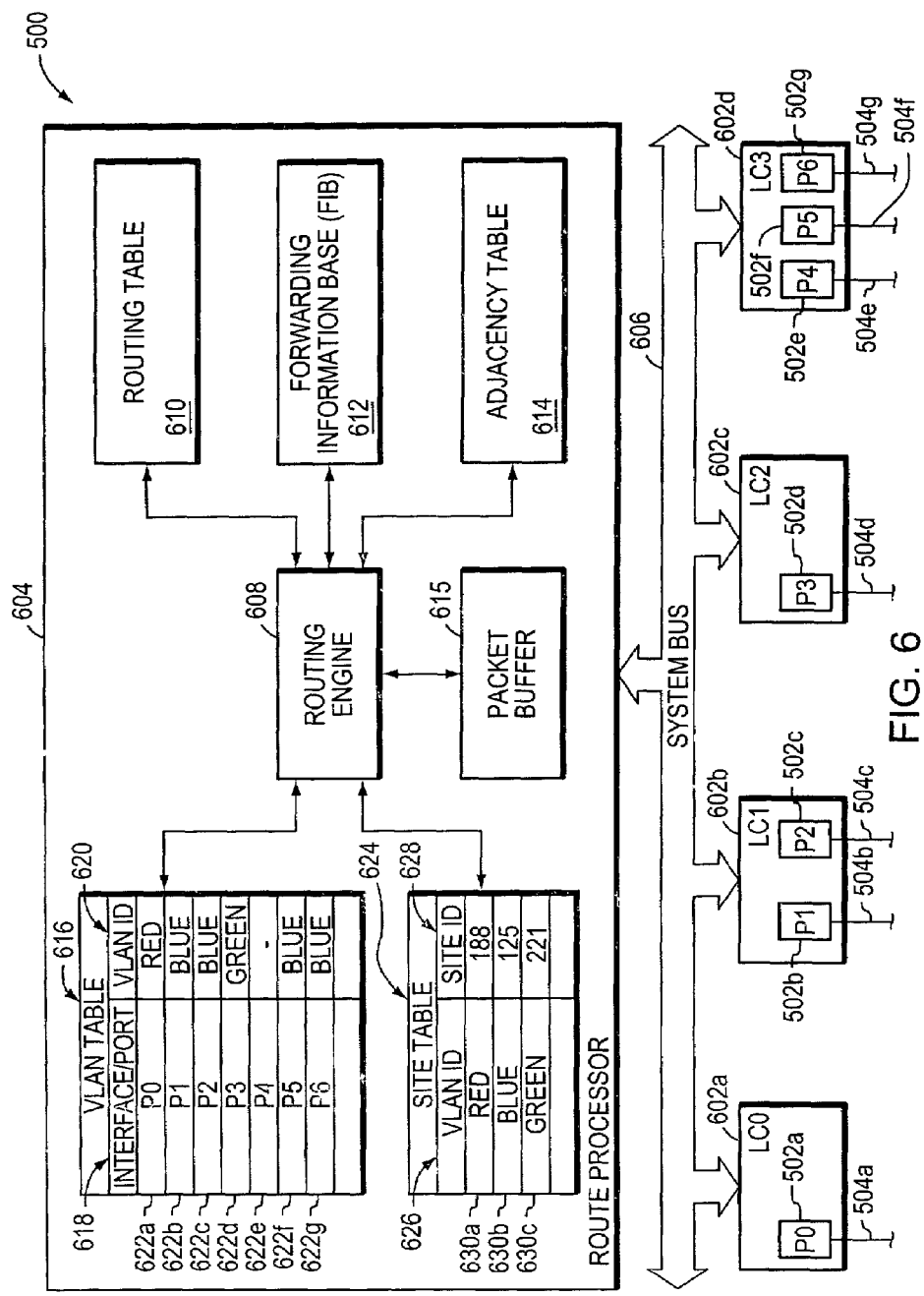

FIG. 8

| 132 | 131 130 | 129 118 | 117 64 | 63 0 |
|---|---|---|---|---|
| 0 | 11 | LINK_ID | 0 | INTERFACE ID |

FIG. 9

| 132 | 131 130 | 129 118 | 117 80 | 79 64 | 63 0 |
|---|---|---|---|---|---|
| 0 | 10 | SITE_ID | 0 | SLA | INTERFACE ID |

FIG. 10

| 132 131 | 120 119 | 116 115 | 112 111 | 0 |
|---|---|---|---|---|
| 1 | ZONE_ID | FLAGS | SCOPE | GROUP ID |

FIG. 11

| 132 | 131 130 | 129 128 | 127 64 | 63 0 |
|---|---|---|---|---|
| 0 | 00 | 00 | NETWORK PREFIX | INTERFACE ID |

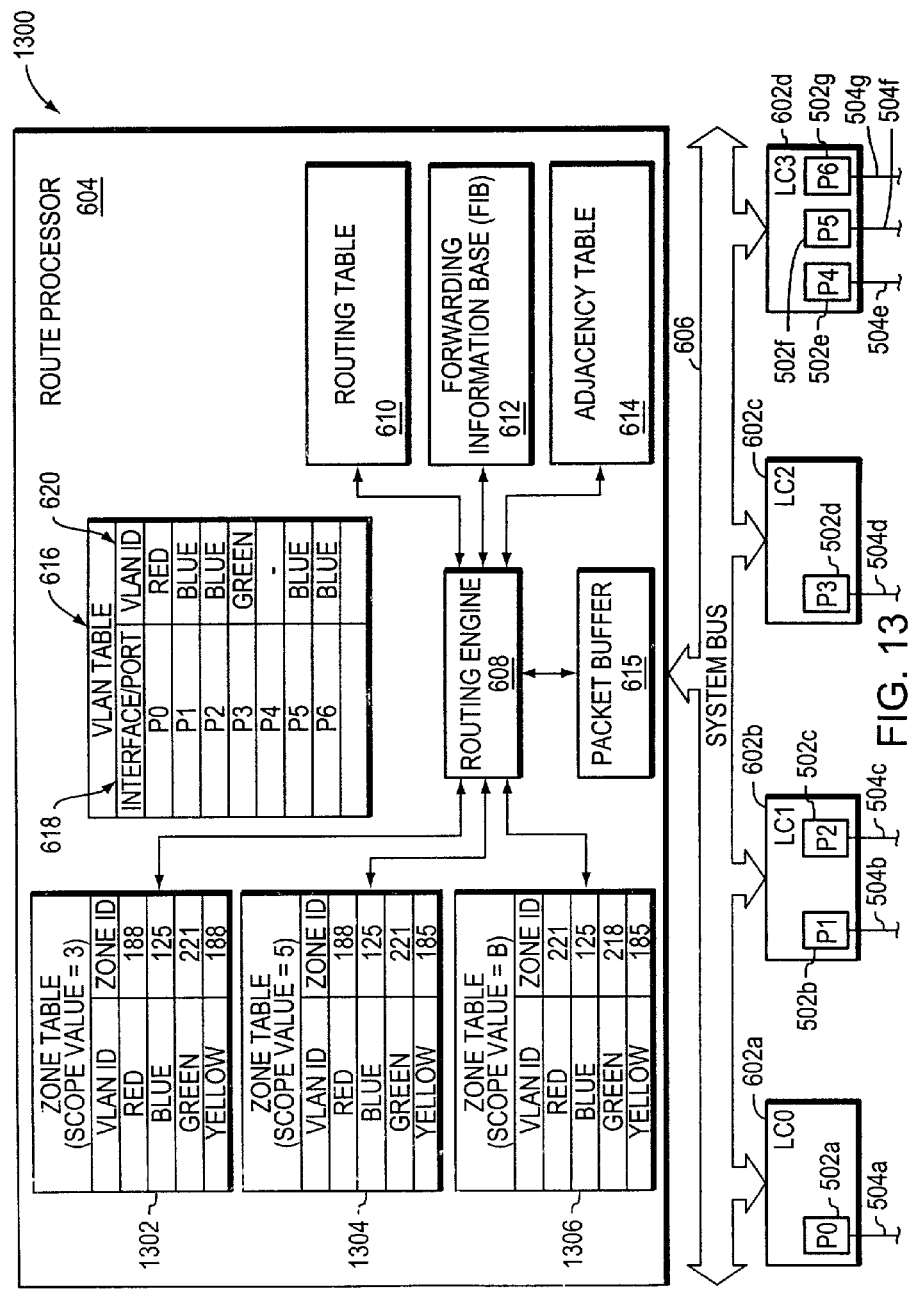

US 7,095,738 B1

SYSTEM AND METHOD FOR DERIVING IPV6 SCOPE IDENTIFIERS AND FOR MAPPING THE IDENTIFIERS INTO IPV6 ADDRESSES

CROSS-REFERENCE TO RELATED APPLICATION

This application is related to the following co-pending, commonly owned U.S. patent application:

U.S. patent application Ser. No. 09/964,702 entitled SYSTEM AND METHOD FOR MAPPING AN INDEX INTO AN IPV6 ADDRESS, filed Sep. 27, 2001.

BACKGROUND OF THE INVENTION

1. Field of the Invention

This invention relates to computer networks and, more specifically, to the making of forwarding decisions for network messages.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or internet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" or interconnection function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address. Ports used to couple switches to each other are generally referred to as a "trunk" ports, whereas ports used to couple switches to LANs or end stations are generally referred to as "access" ports.

Other network devices, commonly referred to as routers, may operate at higher communication layers, such as layers 3, 4 or even higher. Layers 3 and 4 of Transmission Control Protocol/Internet Protocol (TCP/IP) networks correspond to the IP and TCP/User Datagram Protocol (UDP) layers, respectively. Data packets or frames at the IP layer also include a header that contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks. Many equipment manufacturers include both layer 2 switching and layer 3 routing functions in a single device.

Virtual Local Area Networks

A computer network may also be segregated into a series of logical network segments. U.S. Pat. No. 5,394,402, issued Feb. 28, 1995 (the "'402 patent"), for example, discloses an arrangement for associating any port of a switch with any particular segregated network group. Specifically, according to the '402 patent, any number of physical ports of a particular switch may be associated with any number of groups within the switch by using a virtual local area network (VLAN) arrangement that virtually associates the port with a particular VLAN designation. These VLAN designations are also associated with the messages that are received on these ports. In particular, every time a message is received on a given access port, the VLAN designation for that port, as stored in a memory portion of the bridge, is associated with the message. For convenience, each VLAN designation is often associated with a different color, such as red, blue, green, etc.

In many cases, it may be desirable to interconnect a plurality of these switches in order to extend the VLAN associations of ports in the network. By extending VLAN associations across multiple devices, those entities having the same VLAN designation function as if they are all part of the same LAN segment. Message exchanges between parts of the network having different VLAN designations are specifically prevented in order to preserve the boundaries of each VLAN segment or domain. In addition to the '402 patent, the Institute of Electrical and Electronics Engineers (IEEE) has promulgated the IEEE 802.1Q specification standard for Virtual Bridged Local Area Networks. The IEEE's 802.1Q standard supports VLANs and defines a specific VLAN-tagged message format for transmission on trunks.

IPv6

Although it has performed well, several deficiencies have been identified with the current version (four) of the Internet Protocol (IPv4). One of the primary deficiencies is the limited number of available addresses. Specifically, IPv4 provides for 32-bit addresses. IPv4 addresses are expected to be exhausted in the next few years. As a result, work has been ongoing to develop a replacement to IPv4. This replacement or next generation is known as Internet Protocol version 6 or IPv6.

FIG. 1 is a highly schematic block diagram of an IPv6 packet 100 which includes a plurality of fields. In particular, the IPv6 packet 100 includes a version field 102, a traffic class field 104, a flow label field 106, a payload length field 108, a next header field 110, and a hop limit field 112. The IPv6 packet 100 further includes a source address (SA) field 114, a destination address (DA) field 116 and a variable length data field 118. The SA and DA fields 114, 116 are each 128-bits in length. That is, while IPv4 defined 32-bit address spaces, IPv6 has 128-bit address spaces, substantially increasing the number of available IP addresses.

Several address types or formats have been defined for IPv6. Request for Comments (RFC) 2374, for example, defines so-called Aggregatable Global Unicast Addresses. The DA field 116 of FIG. 1 illustrates an Aggregatable Global Unicast Address, which includes a 3-bit format prefix (HP) field 120, which is set to binary "001", a 13-bit Top-Level Aggregation (TLA) Identifier (ID) field 122, an 8-bit reserved field 124 to accommodate the growth in TLA IDs, a 24-bit Next-Level Aggregation (NLA) ID field 126, a 16-bit Site-Level Aggregation (SLA) ID field 128, which is similar to a subnet ID in IPv4, and a 64-bit interface ID field 130.

IPv6 also defines two types of local use or scoped unicast addresses: link-local unicast addresses and site-local unicast addresses. In contrast to the Aggregatable Global Unicast Addresses described above, link-local and site-local addresses are not globally unique. Instead, link-local addresses are unique only on a single link, while site-local addresses are unique only within a given site. Link-local addresses were developed to support auto-configuration, while site-local addresses were developed, at least in part, to allow computer networks that are not connected to the global Internet to nonetheless use IPv6 address schemes. A site, which is not rigorously defined in IPv6, is typically intended to cover a region of topology that belongs to a single organization and that is located within a particular geographic location. A link typically refers to a LAN or a bridged network.

FIG. 2 is a highly schematic block diagram of an IPv6 link-local unicast address 200. The link-local unicast address 200 includes a 10-bit prefix 202, which is set to binary "1111 1110 10", to identify the address as a link-local unicast address. The prefix 202 is located at higher order bit positions 118 to 127, which may be represented by the notation <127:118>. Address 200 further includes a 54-bit intermediary field 204, which is set to null, i.e., all zeros, and a 64-bit interface ID field 206, which is similar to field 130 (FIG. 1), and is at bit positions <63:0>.

FIG. 3 is a highly schematic block diagram of an IPv6 site-local unicast address 300. The site-local unicast address 300 similarly includes a 10-bit prefix 302, which, in the context of a site-local unicast address, is set to binary "1111 1110 11". The site-local unicast address 300 further includes a 38-bit intermediary field 304 which is also set to null, a 16-bit Site-Level Aggregation (SLA) Identifier (ID) field 306, which is similar to field 128 (FIG. 1) and a 64-bit interface ID field 308, which is similar to field 130 (FIG. 1), and is also at bit positions <63:0>.

Intermediate devices, such as routers, must only forward packets containing site-local addresses on outbound interfaces that are associated with the same site as the interface on which the packet was received. This is due, at least in part, to the fact that entities located within different sites may nonetheless be using the same interface ID values. Packets carrying link-local destination addresses are not meant to be forwarded by layer 3 (L3) devices at all, other than back out the logical interface on which they were received.

In addition to unicast addresses, IPv6 also provides for multicast destination addresses. According to RFC 2373, multicast addresses are only to be used as destination addresses and not as source addresses. FIG. 4 is a highly schematic illustration of a multicast destination address 400. Multicast address 400 includes an 8-bit prefix 402, which is set to binary "1111 1111" to identify the address as a multicast address. The multicast address 400 further includes a 4-bit flags field 404, which is defined as a set of four 1-bit flags. To date, only the last flag of the flags field 404 has a defined meaning, indicating whether the multicast address corresponds to a "well-known" multicast address, as assigned by the global internet numbering authority, or to a "transient" multicast address. The other flags are currently reserved. A 4-bit scope field 406 indicates whether the multicast message has a global scope or some limited scope. That is, IPv6 also defines multicast destination addresses that are unique only in some specified region of the network topology, called a zone. A group identifier (ID) field 408 specifies the address's multicast group. Nodes or entities can subscribe to receive messages addressed to a particular group ID in a specific zone.

Unlike unicast addresses, which can have at most three scopes, namely, link, site or global, multicast addresses can have up to sixteen different scopes, as permitted by the 4-bit scope field. More specifically, RFC 2373, "IP Version 6 Addressing Architecture", dated July 1998 defines the following scopes for multicast addresses:

| Value | Scope |
| --- | --- |
| 0 | reserved |
| 1 | node-local |
| 2 | link-local |
| 3 | unassigned |
| 4 | unassigned |
| 5 | site-local |
| 6 | unassigned |
| 7 | unassigned |
| 8 | organization-local |
| 9 | unassigned |
| A | unassigned |
| B | unassigned |
| C | unassigned |
| D | unassigned |
| E | global scope |
| F | reserved |

As shown, a multicast destination address can have one of fourteen different scopes, putting aside the two reserved values (0 and F).

The definition of multiple scopes for both unicast and multicast addresses imposes complexities on intermediate network devices, such as routers, which need to process and forward packets from their interfaces at high rates of speed. More specifically, as is the case with scoped unicast addresses, scoped multicast addresses are not to be forwarded beyond the limits of the zone having the scope specified by the value of the scope field 406. This is due to the fact that entities within different zones of the same scope may be using the same multicast address values for different multicast groups. This can impose significant complexities for all but node-local and global multicast addresses. From a forwarding point of view, the node-local scope does not require very complicated processing because such addresses are not meant to be sent from a node's interface. If a router receives an IPv6 packet with a node-local destination address, it simply drops the packet as the packet can only have been received in error. For global scope destination addresses, no particular processing or handling is required because such addresses are guaranteed to be unique globally. The remaining twelve kinds of scoped multicast addresses, however, can impose complex processing requirements.

In the Internet Draft document entitled IPv6 Scoped Address Architecture, dated November 2001, the authors proposes the creation of a plurality of routing tables to forward site-local addresses. In particular, an intermediate network device whose interfaces are coupled to n different sites establishes n+1 routing tables; one for global addresses and one for each of the n sites. To forward a packet containing a site-local destination address, the router accesses the routing table associated with the site on which the packet was received and, if there is a match, forwards the packet on the identified outbound interface. This approach, however, as recognized in the Internet Draft document itself, increases protocol processing time, thereby reducing the efficiency of the intermediate device. Furthermore, for multicast addresses, it would require the creation and maintenance of numerous multicast routing tables, one for each zone of a certain multicast scope to which the intermediate network device is connected. As there are twelve possible non-global multicast scopes, each potentially requiring several tables, the introduction of scoped multicast addresses substantially increases the complexity of packet processing and forwarding, leading to a likely reduction in throughput.

Accordingly, a need exists for a system capable of forwarding scoped addresses, especially multicast addresses, efficiently.

SUMMARY OF THE INVENTION

Briefly, the invention relates to a system and method that utilizes Virtual Local Area Network (VLAN) designations as Internet Protocol version 6 (IPv6) link identifiers, and that maps VLAN designations to IPv6 site identifiers (IDs). The system also generates a compacted or encoded look-up address based on the destination address specified within a received network message, such as an IPv6 packet. The invention is preferably implemented at an intermediate network device, such as a router, having a plurality of interfaces for receiving and forwarding packets, and a route processor for making forwarding decisions for received packets. The route processor includes a routing engine, a routing table, a forwarding information base (FIB), a VLAN store and a site ID store. At least some of the router's interfaces, moreover, are preferably associated with VLAN designations, and the site ID store is pre-configured with a mapping of VLAN designations to site IDs. In particular, each VLAN designation is mapped to just one site ID, but more than one VLAN designation may be mapped to the same site ID. The look-up address generated for a packet is applied to the FIB in order to generate a forwarding decision for the packet in an efficient and high-speed manner.

Upon receiving a packet having a scoped multicast destination address, the routing engine retrieves the VLAN designation associated with the interface on which the packet was received (i.e., the inbound interface). The routing engine then generates a compacted look-up address for the packet. The look-up address preferably includes a 1-bit unicast/multicast flag which is preferably asserted for multicast addresses and de-asserted for unicast addresses. The look-up address further includes a zone_ID field, a flags field, a scope value field and a group ID field. In one embodiment, if the scope value of the packet's multicast destination address is between hexadecimal "2" and "4", inclusive, the routing engine loads the look-up address's zone_ID field with the VLAN designation associated with the inbound interface. If the scope value is between hexadecimal "5" and "D", inclusive, the routing engine uses the retrieved VLAN designation as an index to obtain the corresponding site ID of the inbound interface and then loads the zone_ID field with this site ID.

In a second embodiment, the router has a plurality of zone ID stores each associated with a corresponding zone value. Each zone ID store, moreover, maps one or more VLAN IDs to a respective zone ID value. For multicast destination addresses having a scope value between hexadecimal "3" and "D", inclusive, the routing engine utilizes the scope value contained in the address to index to the appropriate zone ID store, retrieves the value corresponding to the VLAN designation of the inbound interface, and loads the retrieved value into the zone_ID field of the corresponding look-up address. In both embodiments, the flags, scope value and group ID fields of the look-up address are loaded with the corresponding values from the received multicast destination address. The look-up address is then applied to the FIB, which is a forwarding table optimized to permit fast lookups, to derive the outbound interface(s) from which the packet is to be forwarded to reach the one or more destination entities or nodes subscribe to the multicast group ID. In accordance with the present invention, the FIB is preprogrammed in a manner to process look-up addresses with the described format.

After deriving the outbound interface(s) for the multicast packet, the routing engine also checks to see whether the packet's source address is a link-local or a site-local unicast address. If it is, the routing engine makes a check that the VLAN designation (for link-local unicast source addresses) or the site ID (for site-local unicast source addresses) corresponding to the inbound interface matches the VLAN designation or the site ID corresponding to the identified outbound interface(s). The packet is then forwarded only from those identified interface(s) for which there is a match.

BRIEF DESCRIPTION OF THE DRAWINGS

The invention description below refers to the accompanying drawings, of which:

FIGS. 1–4, previously discussed, are highly schematic illustrations of conventional network messages;

FIG. 6 is a highly schematic, partial block diagram of the intermediate network device of FIG. 5 in greater detail;

FIGS. 8–11 are highly schematic block diagrams of look-up addresses as generated in accordance with the present invention;

FIG. 13 is a highly schematic, partial block diagram of an intermediate network device illustrating another embodiment of the present invention.

DETAILED DESCRIPTION OF AN ILLUSTRATIVE EMBODIMENT

Figure 5:
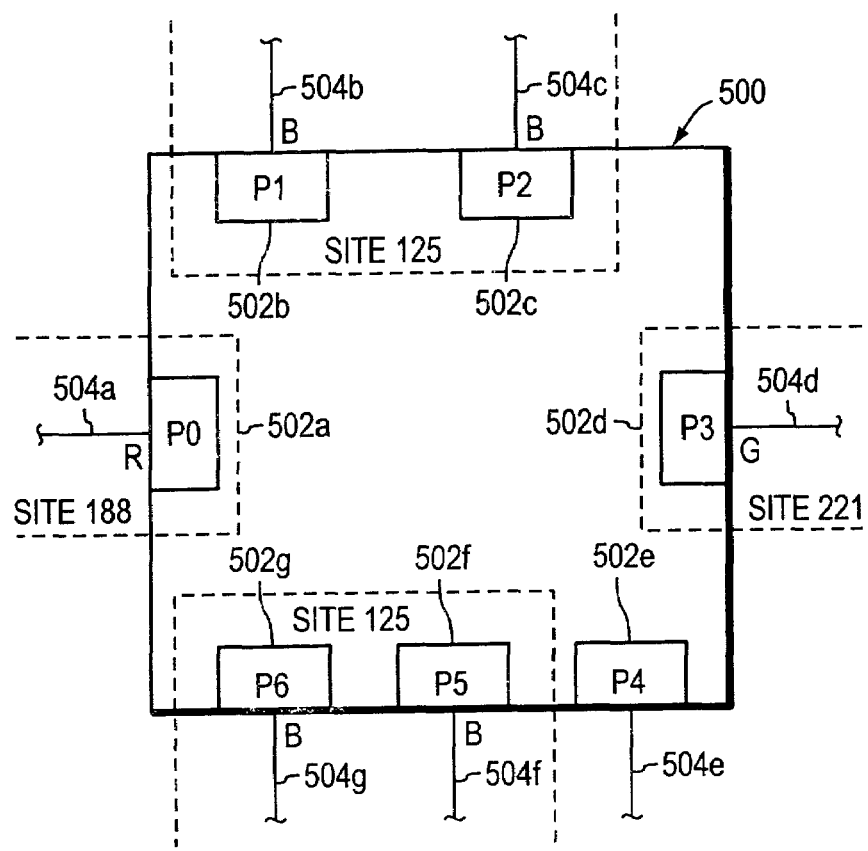
FIG. 5 is a highly schematic block diagram of an intermediate network device in accordance with the present invention.

FIG. 5 is a highly schematic illustration of an intermediate network device 500 in accordance with the present invention. Device 500 includes a plurality of interfaces or ports 502*a–g* from which network messages can be received and forwarded. Each port, moreover, may be identified by a corresponding port identifier, e.g., P0–P6. Coupled to each port 502*a–g* is a respective link 504*a–g*. As described herein, device 500 is configured to forward network messages, e.g., packets and/or frames, originated by a source entity and received by the device 500 on a first port, e.g., P1, onto a second port, e.g., P5 for receipt by a destination entity.

Device 500 is preferably disposed within a computer network (not shown), and each port or interface of device 500 may be associated with one or more Virtual Local Area Network (VLAN) designations or identifiers (IDs) defined within the network. For example, port 502*a* or P0, which is an access port, is associated with the red (R) VLAN ID, ports 502b, 502c, 502f and 502g, which are also access ports, are each associated with the blue (B) VLAN ID, and port 502d or P3, which is another access port, is associated with the green (G) VLAN ID. As indicated above, access ports are typically coupled directly to LANs and/or end stations. When a network message, such as a packet or frame, is received on an access port, the port's VLAN ID is associated with the message.

Port 502e or P4, which is a trunk port, is not associated with a VLAN ID. As indicated above, trunk ports are typically coupled to links which interconnect intermediate network devices and carry messages belonging to many different VLANs. A network message forwarded on or received from a trunk port is generally tagged with the VLAN ID associated with the message. In this way, the VLAN ID associated with a message received on a trunk port is readily and unambiguously apparent. Trunk ports, such as port 502e, may be configured to operate in accordance with any number of VLAN tagging or encapsulation protocols, such as the IEEE 802.1Q Virtual Bridged Local Area Networks Protocol specification standard or the Inter-Switch Link (ISL) mechanism from Cisco Systems, Inc., as described in U.S. Pat. No. 5,742,604, which is hereby incorporated by reference in its entirety.

In some situations, a trunk port may be configured to support a "native VLAN". A native VLAN refers to the VLAN designation associated with all untagged messages received on the trunk port, i.e., with all untagged messages traversing the respective link.

The association of ports to VLAN IDs is preferably accomplished in a conventional manner. For example, a network administrator may make the associations working either locally or remotely from device 500. Additionally or alternatively, the device 500 may participate in the Generic Attribute Registration Protocol (GARP) VLAN Registration Protocol (GVRP). With GVRP, intermediate devices, end stations, hosts, servers, workstations, etc. can issue and revoke declarations regarding their membership in specific VLANs. In addition to GVRP, VLAN membership information may be distributed through the VLAN Trunk Protocol (VTP), which is described in the IEEE 802.1s Multiple Spanning Trees Draft Supplement.

The term intermediate network device is intended broadly to cover any intermediate device for interconnecting end stations of a computer network, including, without limitation, layer 3 (L3) devices or routers, as defined by Request for Comments (RFC) 1812 from the Internet Engineering Task Force (IETF), intermediate devices that are fully or only partially compliant with RFC 1812, intermediate devices operating above L3, intermediate devices that provide additional functionality, such as Virtual Local Area Network (VLAN) support, IEEE 802.1Q support and/or IEEE 802.1D support, etc. Intermediate network device also includes layer 2 intermediate devices, such as switches and bridges, including, without limitation, devices that are fully or partially compliant with the IEEE 802.1D standard and intermediate devices that provide additional functionality, such as VLAN support, IEEE 802.1Q support and/or IEEE 802.1p support, Asynchronous Transfer Mode (ATM) switches, Frame Relay switches, etc.

A suitable platform for router 500 is the Catalyst 6000, the Catalyst 6500 or the Cisco 7500 series of routers from Cisco Systems, Inc.

FIG. 6 is a partial block diagram of intermediate device 500 in greater detail. Device 500 includes a plurality of line cards 602a–d, which may be identified as LC0–3, and a route processor 604. The route processor 604 and line cards 602a–d are preferably in communicating relationship by one or more communication structures, such as system bus 606. Accordingly, packets or portions thereof can be exchanged among the lines cards and the route processor. The route processor 604 preferably includes a routing engine 608, a routing table 610, a forwarding information base (FIB) 612, an adjacency table 614, and one or more packet buffers, such as buffer 615.

The FIB 612, like the routing table 610, contains forwarding information or routes through the computer network. The routing table 610 is suitably configured and arranged so that searches may be performed primarily through software, such as by Longest Prefix matching routines. The FIB 612 is suitably configured and arranged to permit lookups at a faster rate than can otherwise be performed by the routing table 610. The ability to perform at least some searches more quickly typically improves the performance of the route processor 604 by generating routing decisions for specific packets faster than can often be done with a routing table alone. The adjacency table 614 contains the Layer 2 (L2) addresses, e.g., Media Access Control (MAC) addresses, of nodes, e.g., intermediate network devices, that are adjacent to device 500, as well as the output ports and VLAN IDs (in the case of trunk ports) to be used to reach those devices. A node is considered adjacent to device 500 if it can be reached in a single hop.

It should be understood that intermediate device 500 may be configured to have a decentralized or distributed forwarding architecture. In this case, each line card 602a–d is provided with its own router processor, which is similar to route processor 604. Routing decisions, i.e., for packets received by the ports of a single line card, can be performed by the local route processor, thereby improving performance. Each route processor disposed on the line cards preferably operates in the same manner as described herein in connection with route processor 604.

As described above, a plurality of VLAN designations have been established within the computer network within which device 500 is disposed, and each port 502 of device 500 that is configured as an access port may be associated with one or more VLAN IDs. Other ports may be configured as trunk ports. In the preferred embodiment, the route processor 604 includes or has access to a VLAN table 616. The VLAN table 616 is preferably organized, at least logically, as a table array having a plurality of columns and rows whose intersections define cells or records for storing information. In particular, the VLAN table 616 has an interface or port column 618, a VLAN ID column 620 and a plurality of rows 622a–g. A separate row 622 is preferably established for each interface or port configured at device 500. The cells corresponding to column 620 contain the VLAN ID associated with the respective interface or port. For example, as shown by the contents of the cell of row 622f corresponding to column 620, port P5 is associated with the blue (B) VLAN ID. Row 622e instead shows that port P4 is a trunk port.

In addition to the VLAN designations, the computer network within which device 500 is disposed may also be organized to include one or more sites so as to support IPv6 site-local addresses. Each site, moreover, may have a corresponding site identifier (ID), and the boundaries of these sites may be arranged to pass through the intermediate devices disposed within the network, including device 500.

In accordance with the present invention, the VLAN designations that have been established within the computer network are mapped to site IDs. A VLAN can be mapped and thus belong to only one site. The site ID, moreover, which identifies the site itself, is local to each intermediate network device. Within each device, each VLAN ID, as indicated above, is mapped to only one site ID, although multiple VLAN IDs may be mapped to the same site ID. In other words, each site ID is mapped to a VLAN group and each VLAN group may have one or more VLAN designations as members. In the preferred embodiment, the mapping of VLAN IDs to site IDs is performed by a network administrator configuring the respective device, i.e., device 500. In particular, the network administrator first associates the device's physical network ports with respective VLAN IDs. The network administrator then assigns within the device one or more VLAN IDs to some locally established site IDs. The network administrator may use a conventional Command Line Interface (CLI) terminal or window or some other terminal or window in order to configure the respective device. The network administrator may also accomplish the configuring of site IDs remotely using a configuration protocol, such as the Simple Network Management Protocol (SNMP).

The results of this configuration process are preferably stored at a table, such as site table 624, which may be disposed at or is at least accessible by the route processor 604. Site table 624 is also organized, at least logically, as a table array having a plurality of columns and rows whose intersections define cells for storing data. In particular, site table 624 has a VLAN ID column 626, a site ID column 628 and a plurality of rows 630a–c. A separate row 622 is preferably established for each VLAN ID configured at device 500. The cells corresponding to column 628 contain the site ID value to which the VLAN ID of the respective row has been assigned. As shown, the red VLAN ID is mapped to site ID "188", the blue VLAN ID is mapped to site ID "125", and the green VLAN ID is mapped to site ID "221".

In operation, the routing engine 608 of device 500 utilizes the information in routing table 610, FIB 612 and adjacency table 614 to make forwarding decisions for is network messages, e.g., packets and/or frames, received on ports 502a–g. Furthermore, routing engine 608 uses the information in the VLAN table 616 and the site table 624 in cooperation with the structure and organization of the FIB 612 and the adjacency table 614 to ensure that addresses of limited scope, including scoped unicast and multicast IPv6 addresses, are not forwarded beyond their respective zone.

Figure 7A:
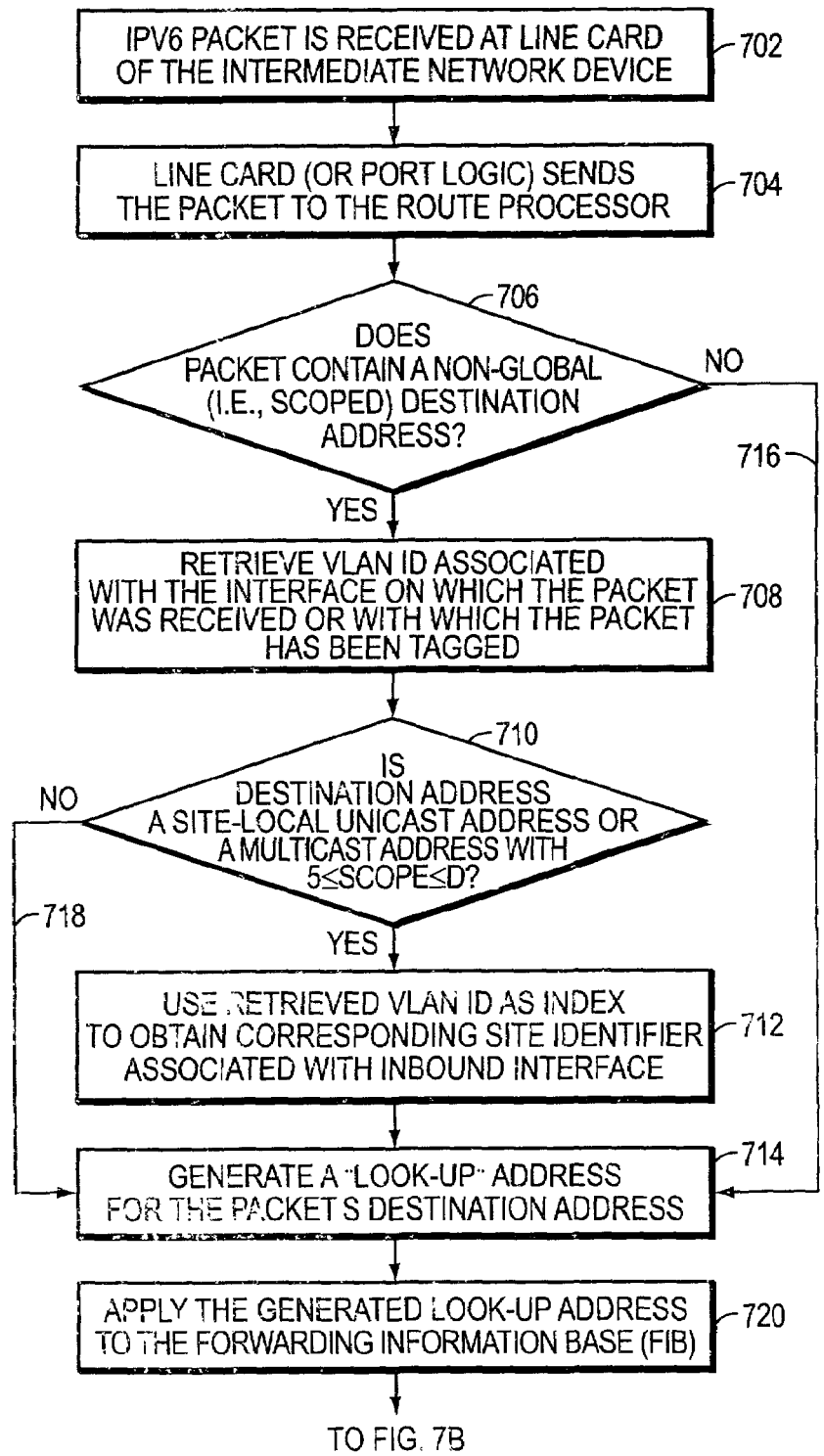
FIGS. 7A–D is a flow diagram of a preferred method in accordance with the present invention.

FIGS. 7A–D is a flow diagram of a method in accordance with a preferred embodiment of the present invention. Suppose, for example, that device 500 receives a network message, i.e., a packet 100 (FIG. 1) in conformance with the IPv6 specification standard, on port 502c, as indicated at block 702 (FIG. 7A). The line card 602b passes the packet 100 or a portion thereof to the route processor 604 along with the port number on which it was received, as indicated at block 704. The route processor 604 stores the packet 100 in the packet buffer 615 and proceeds to render a forwarding decision. In a distributed forwarding architecture, port logic sends the packet to the local route processor. The routing engine 608 examines the contents of the packet's destination address field 116 to see whether it contains a global or non-global, i.e., scoped, IPv6 address, as indicated at decision block 706. In particular, the routing engine 608 determines whether the first 10-bits of the destination address are binary "1111 1110 10", indicating that the address is a link-local unicast address, or "1111 1110 11", indicating that the address is a site-local unicast address, or whether the first eight bits of the address are binary "1111 1111", indicating that the address is a multicast address. If the packet's destination address is a multicast address, the routing engine 608 also examines the scope value field 406 (FIG. 4) to see whether the multicast address has a limited scope, i.e., a scope value of other than hexadecimal "E".

If the destination address has a limited scope, the routing engine 608 retrieves the VLAN ID associated with the port, i.e., port 502c, on which the packet was received, as indicated at block 708. Specifically, the routing engine 608 performs a look-up on the VLAN ID table 616 using the port number, i.e., P2, of the port on which the packet 100 was received. In this case, the routing engine 608 determines that the message 100 was received on a port associated with the blue (B) VLAN ID. For a packet received on a trunk port, the VLAN ID is retrieved from the packet itself which has been tagged with the respective VLAN ID, as also indicated at block 708.

Next, the routing engine 608 determines whether the destination address is a site-local unicast address or a multicast address whose scope value from field 406 (FIG. 4) is in the range of hexadecimal "5" to "D", inclusive, as indicated at decision block 710. If so, the routing engine 608 uses the VLAN ID of the inbound interface to retrieve or derive the corresponding site ID of the inbound interface, as indicated at block 712. More specifically, the routing engine 608 uses the retrieved VLAN ID, i.e., blue, as an index into site table 624 to locate the matching entry, i.e., row 630b. The routing engine 608 then accesses the cell that corresponds to column 628 in order to obtain the corresponding site ID value, i.e., "125".

The routing engine 608 next generates a compacted or encoded look-up address for the network message 100, as indicated at block 714. As described herein, the lookup address resembles the original destination address but, in the case of a destination address of limited scope, is embedded with the retrieved VLAN ID and/or site ID. Returning to decision block 706, if the packet's destination address is a global address, then the routing engine 608 proceeds directly to the step of generating the look-up address, as indicated by No arrow 716. Returning to decision block 710, if the destination address is neither a site-local destination address nor a multicast address with a scope value within the range 5≦scope value≦D, then the destination address must either be a link-local unicast address or a multicast address whose scope value is between hexadecimal "2" and "4", inclusive. In this case, as the routing engine has already retrieved the VLAN ID (which will be used in the look-up address as described below) and no site ID is needed, the routing engine proceeds directly to the step of generating the look-up address, as indicated by No arrow 718.

FIGS. 8–11 are highly schematic illustrations of compacted or encoded look-up addresses 800, 900, 1000, 1100, respectively, in accordance with the present invention. Look-up address 800 corresponds to a link-local unicast destination address. Look-up address 900 corresponds to a site-local unicast destination address. Look-up address 1000 corresponds to a multicast destination address. Look-up address 1100 corresponds to a global unicast destination address.

Each look-up address 800, 900, 1000, 1100 preferably starts with a 1-bit message type flag 802, 902, 1002 and 1102. If the corresponding destination address is a unicast address, then message type flag, such as message type flags 802, 902 and 1102 of look-up addresses 800, 900, 1000, 1100, is de-asserted, e.g., set to null or zero. If the corresponding destination address is a multicast address, then the message type field, such as message type field 1002 of look-up address 1000, is asserted, e.g., set to "1".

Following the message type field of look-up addresses 800, 900 and 1100, which each correspond to unicast destination addresses, is a 2-bit scope field 804, 904 and 1104. For look-up address 800, which corresponds to a link-local address, the scope field 804 is preferably set to binary "11". For look-up address 900, which corresponds to a site-local address, the scope field 904 is preferably set to binary "10". For look-up address 1100, which corresponds to a global address, the scope field 1104 is preferably set to binary "00". Following the scope field 804 of look-up address 800 is a link_ID field 806 which is preferably on the order of 12-bits, a 54-bit null field 808 and a 64-bit interface ID field 810. In accordance with the present invention, if the corresponding destination address is a link-local unicast address 200, then the link_ID field 806 is loaded with a value associated with the link on which the respective network message was received. Preferably, this value corresponds to the VLAN ID associated with the respective link. Further, the null field 808 and the interface ID field 810 are preferably loaded with the values from the intermediary field 204 (FIG. 2) and the interface ID field 206, respectively, of the corresponding link-local destination address 200.

Following the scope field 904 of look-up address 900 is a site_ID field 906, a 38-bit null field 908, a 16-bit Site-Level Aggregation (SLA) ID field 910 and a 64-bit interface ID field 912. The site_ID field 906, which is preferably 12-bits, is loaded with a value corresponding to the site from which the respective network message was received. Preferably, this value corresponds to a site identifier value. The null field 908, the SLA field 910 and the interface ID field 912 are preferably loaded with the values from the intermediary field 304 (FIG. 3), the SLA ID field 306 and the interface ID field 308, respectively, of the corresponding site-local destination address 300.

Following the scope field 1104 of look-up address 1100 is a 2-bit null or unused field 1106, a 64-bit network prefix field 1108 and a 64-bit interface ID field 1110. The network prefix field 1108 is preferably loaded with the contents of fields 120–128 of the corresponding global destination address. And, the interface ID field 1110 is preferably loaded with the value from the interface ID field 130 of the corresponding destination address.

Following the message type flag 1002 of look-up address 1000, which corresponds to a multicast address, is a 12-bit zone_ID field 1004. Following the zone_ID field 1004 are a 4-bit flags field 1006, a 4-bits scope field 1008 and a 112-bit group ID field 1010. The flags field 1006 and the scope field 1008 of look-up address 1000 are loaded with the same values as contained in the flags field 404 (FIG. 4) and the scope field 406 of the corresponding multicast address 400. Similarly, the group ID field 1010 of the look-up address is loaded with the value from the group ID field 408 of the corresponding multicast address 400. In accordance with the present invention, however, the zone_ID field 1004 is loaded with a value that identifies or otherwise specifies the particular zone of the corresponding multicast address 400. If, for example, the scope value of the corresponding destination address 400 is between hexadecimal "2" and "4", inclusive, then the routing engine 608 loads the zone_ID field 1004 with the VLAN ID that was returned for the inbound interface. If the scope value of the corresponding destination address is between hexadecimal "5" and "D", inclusive, then the routing engine 608 loads the zone_ID field 1004 with the site ID that was returned for the inbound interface.

As shown, each of the generated look-up addresses, 800, 900, 1000 and 1100 is on the order of 133-bits long. It should be understood that without the address encoding of the present invention, appending a site ID value to an IPv6 destination may result in a input value whose width or length exceeds the fixed-size limitations, e.g., 144-bits, of many pre-existing hardware-based routing engines and/or leaves little or no room for future protocol changes. Such a condition could force equipment manufacturers to undertake expensive redesigns of their hardware components and/or implement slower software-based solutions.

It should also be understood that fields 806, 906 and 1004, among others, may be is other lengths, such as 16 bits, and/or may be disposed at other locations of the look-up addresses. Indeed, the length and position of any of the fields of the look-up addresses may be modified and yet still achieve the objects of the present invention.

The link_ID field 806 (FIG. 8) and zone_ID field 1004 are preferably each 12-bits in length to comport with the IEEE 802.1Q specification standard, which calls for 12-bit VLAN IDs. Nonetheless, it should be understood that these fields may be longer or shorter to accommodate VLAN IDs of other lengths.

Figure 7B:
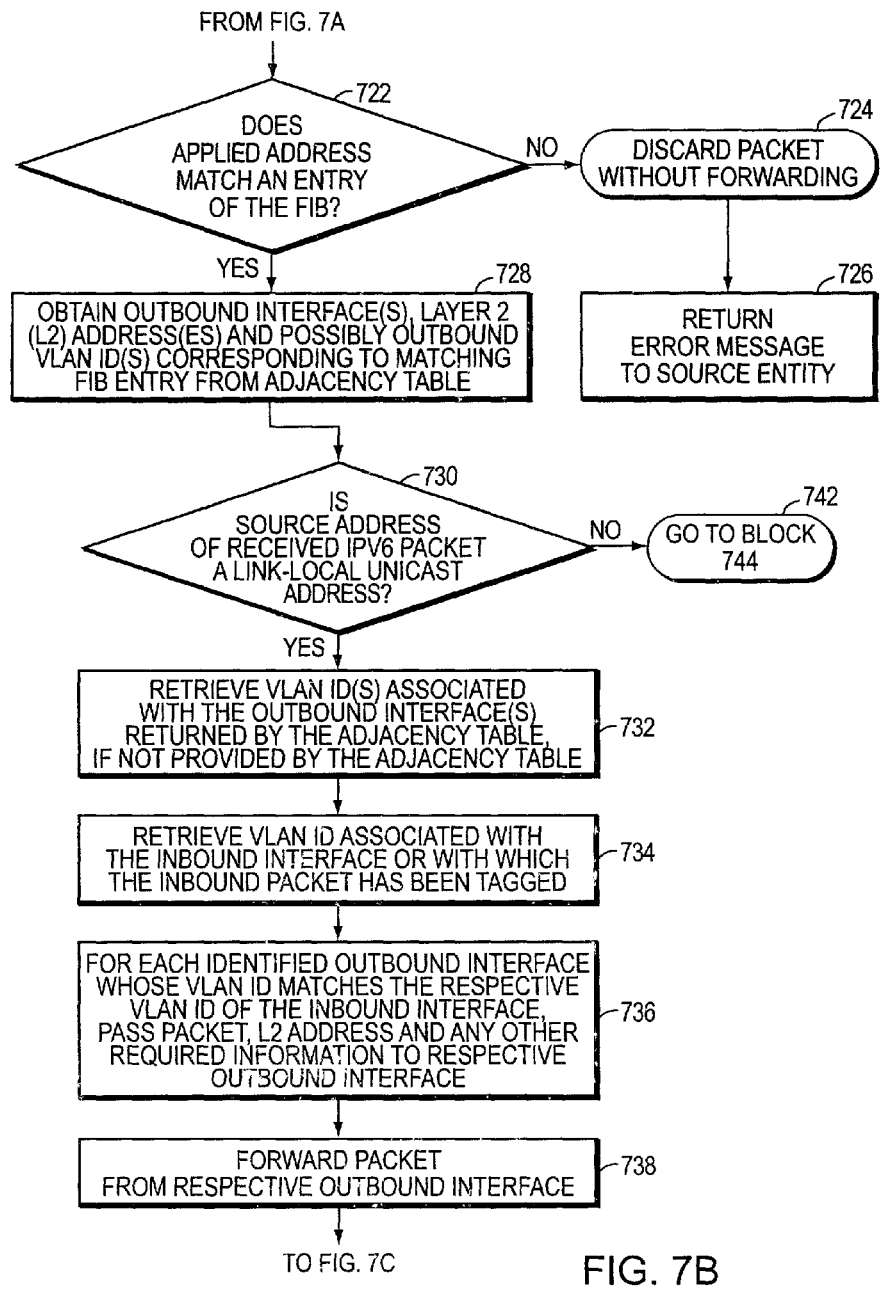

Once it has generated the look-up address for the corresponding destination address, the routing engine 608 applies the look-up address to the FIB 612 in order to render a forwarding decision for the message 100, as indicated at block 720 (FIG. 7A). More specifically, the routing engine 608 determines whether the applied address matches one of the FIB's entries, as indicated at decision block 722 (FIG. 7B).

Figure 12:
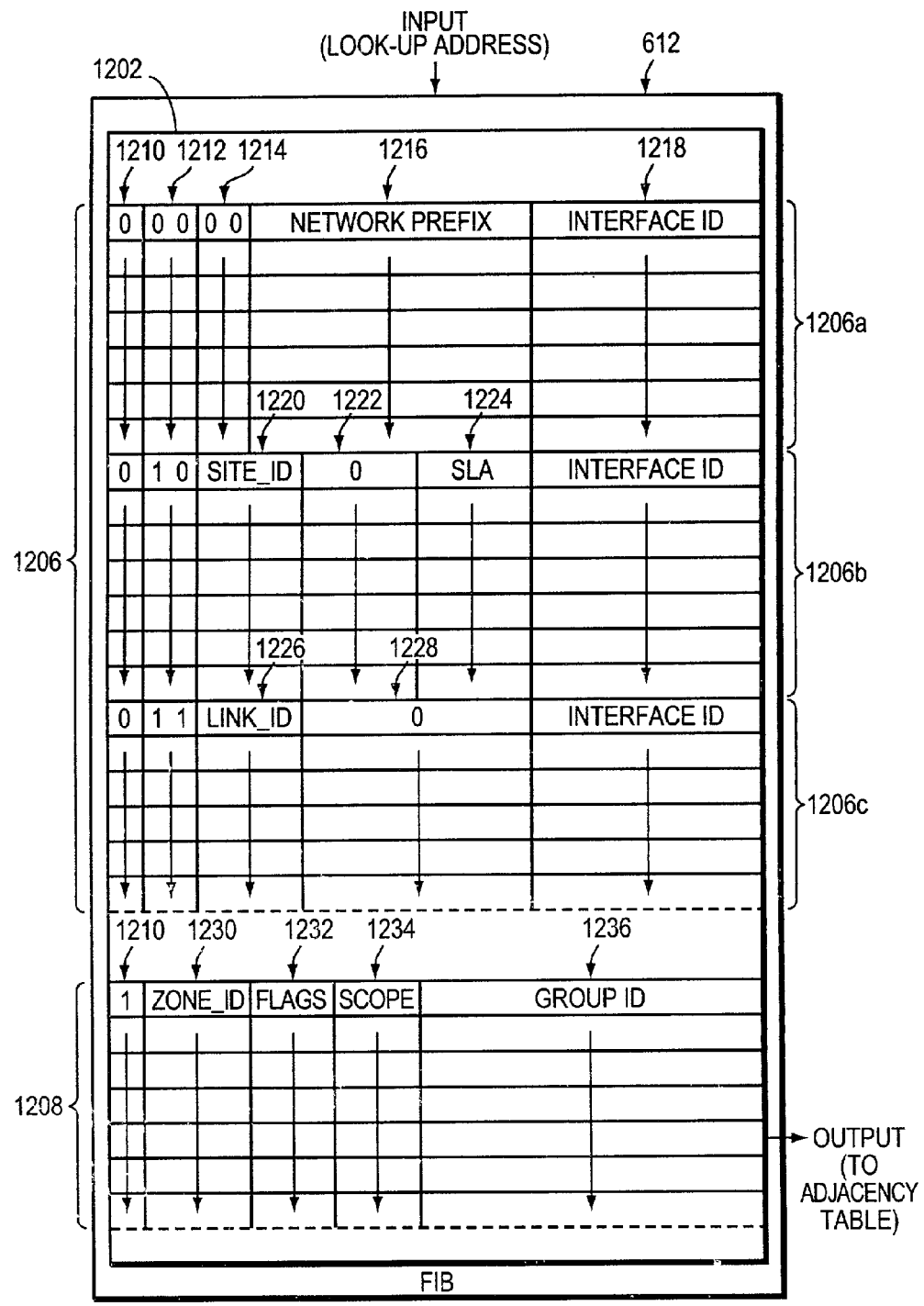
FIG. 12 is a highly schematic block diagram of a forwarding information base (FIB) configured in accordance with the present invention.

FIG. 12 is a highly schematic block diagram illustrating a preferred organization and structure of the FIB 612. The FIB 612 preferably comprises one or more ternary content addressable memories (TCAMs), such as TCAM 1202, organized to have a plurality of row or entries. Each row or entry of the TCAM 1202, moreover, has a plurality of cells that are associated with or assigned one of three possible values, "0", "1" or "don't care". A preferred TCAM 1202 has 512K rows each having a length of 144-bits, which is sufficient to accommodate 133-bit look-up addresses generated from 128-bit IPv6 addresses. To implement the "don't care" value, the TCAM 1202 may be segregated into blocks of cells (each cell being either asserted or de-asserted) and a corresponding mask applied to determine whether the particular cells of its block are "care" or "don't care". Each row of the TCAM 1202 also specifies a pointer to a respective row or entry of the adjacency table 614 (FIG. 6) which is used to store information related to the contents of the matching TCAM entry.

Suitable TCAMs for use with the present invention are commercially available from a number of manufacturers, including Integrated Device Technology, Inc. (IDT) of Santa Clara, Calif., Cypress Semiconductor Corp. of San Jose, Calif., International Business Machines Corp. (IBM) of Armonk, N.Y., NetLogic Microsystems, Inc. of Mountain View, Calif., and from Music Semiconductors of Hackettstown, N.J., among others.

In accordance with the invention, the TCAM 1202 and the adjacency table 614 are preprogrammed with routing information from routing table 610. More specifically, each row of the TCAM 1202 is programmed with IPv6 addresses or address prefixes while each row of the adjacency table 614 is programmed with the outbound interface(s) to be used by device 500 in order to reach the destination address of the corresponding TCAM entry plus other information. If one or more of the outbound interfaces is a trunk port, then the VLAN ID that is to be used by device 500 in tagging the message is also programmed into the adjacency table 614. Preferably, the IPv6 addresses or address prefixes that are programmed into the TCAM 1202 have the same format as the look-up addresses 800, 900, 1000 and 1100, described above. In other words, the rows of the TCAM 1202 contain look-up addresses corresponding to a number of globally unique, site-local and link-local unicast addresses or address prefixes as well as look-up addresses for global and scope limited multicast addresses. In addition, the look-up addresses for site-local and link-local unicast addresses and for scope limited multicast addresses programmed into the TCAM 1202 include the correct site ID or VLAN ID embedded therein.

The TCAM 1202 may be programmed or organized into sections, such as section 1206 whose rows correspond to unicast addresses and section 1208 whose rows correspond to multicast addresses. Each section 1206 and 1208 is preferably formed from a contiguous set of rows of the TCAM 1202. Section 1206, moreover, may be further programmed or organized into three contiguous sub-sections 1206a, 1206b and 1206c. The rows of sub-section 1206a are configured to contain global unicast address values. The rows of sub-section 1206b are configured to contain link-local unicast address values, and the rows of sub-section 1206c are configured to contain site-local unicast address values.

As shown, the rows of the TCAM 1202 within section 1206 have a first column 1210 set to binary "0", followed by a scope column 1212 which may be set to "00", "10" or "11". For subsection 1206a, which corresponds to global unicast destination addresses, the scope column 1212 is followed by a 2-bit unused column 1214, which is set to null, a 64-bit network prefix column 1216, and a 64-bit interface ID column 1218. For subsection 1206b, which corresponds to site-local unicast destination addresses, the scope column 1212 is followed by a 12-bit site_ID column 1220, a 38-bit null column 1222, a 16-bit SLA column 1224, and the above-described 64-bit interface ID column 1218. For subsection 1206c, which corresponds to link-local unicast destination addresses, the scope column 1212 is followed by a 12-bit link_ID column 1226, a 54-bit null column 1228 and the 64-bit interface ID column 1218.

In addition, the rows of section 1208, which correspond to multicast addresses, have the value of first column 1210 set to binary "1". Following the first column 1210 within section 1208, is a 12-bit zone_ID column 1230, a 4-bit flags column 1232, a 4-bit scope value column 1234 and a 112-bit group ID column 1236.

It should be understood that by utilizing a TCAM, one or more of these fields or some portion thereof can be set to "don't care". This can be especially advantageous when the TCAM stores address prefixes.

The FIB 612 is preferably preprogrammed by the routing engine 608 based on the information stored at the routing table 610, which can be populated manually by the network administrator or automatically by using the particular routing protocol implemented by the routing engine 608, such as the well-known Open Shortest Path First (OSPF) routing protocol. The routing table 610 can also be populated with VLAN ID and site ID information either manually or automatically, and this information, in turn, can be used to program the FIB 612. Alternatively, the routing engine 608 can obtain the VLAN ID and site ID information from other sources, such as separate tables.

It should also be understood that the FIB 612 may further include a random access memory (RAM) for each TCAM 1202. Each TCAM entry, moreover, may identify a corresponding entry of the corresponding RAM at which the respective outbound interface is stored. The returned outbound interface could then be used to perform a look-up on the adjacency table which would only include L2 addresses in order to obtain the corresponding L2 address. Those skilled in the art will understand that other arrangements are also possible. For example, the FIB 612 may include other hardware components in place of or in addition to the TCAM(s), such as content addressable memories (CAMs).

The FIB 612 can also be implemented in software designed to permit at least some forwarding decisions to be performed at high speed as compared to the routing table. Alternatively, the FIB 612 may be implemented through some combination of software, hardware and/or firmware components.

In the preferred embodiment, reserved or null fields of the IPv6 addresses programmed into the TCAM 1202, such as those corresponding to columns 1222 and 1228, are specifically included in case these fields are subsequently utilized by some as yet to be proposed protocol or standard. The preferred programming format of TCAM 1202 is thus adaptable to future developments of IPv6.

As indicated above, a look-up address, generated by the routing engine 608 from the packet's destination address, is applied to the FIB 612. If the look-up address does not match an entry of the FIB 612, the routing engine 608 discards the packet without forwarding it, as indicated at block 724 (FIG. 7B), and may return an error message, such as an Internet Control Message Protocol (ICMP) message, to the source entity, informing it that the destination entity cannot be reached, as indicated at block 726.

If the look-up address applied to the FIB 612 matches an entry contained therein, the routing engine 608 obtains the corresponding outbound interface(s) and layer 2 (L2) address(es), as indicated at block 728. As described above, each TCAM entry, which contains an IPv6 address or address prefix in the same format as a look-up address, preferably identifies a corresponding entry in the adjacency table 614. This corresponding entry includes the interface(s) to which the packet 100 should be passed for forwarding to reach the intended recipient(s), the L2 address(es) of the neighboring device(s) and, if an output interface is configured as a trunk port, the VLAN ID with which to tag the forwarded packet on that interface.

It should be understood that a look-up address generated from a link-local unicast address will only match a TCAM entry if the VLAN ID value of the look-up address matches the VLAN ID value programmed into the respective TCAM entry, assuming a match also exists on the other fields. A look-up address generated from a site-local unicast destination address will only match a TCAM entry if the site ID value of the look-up address matches the site ID value programmed into the respective TCAM entry. Similarly, a look-up address generated from a multicast destination address will only match a TCAM entry if the zone_ID value of the look-up address matches the zone_ID value programmed into the respective TCAM entity.

After obtaining the identifier(s) of the outbound interface (s) from the adjacency table 614, the routing engine 608, in accordance with the preferred embodiment, first determines whether the source address of the IPv6 packet is a link-local unicast address, as indicated at decision block 730. If so, the routing engine 608 obtains the VLAN ID(s) associated with the outbound interface(s) returned by the adjacency table 614, as indicated at block 732. If one or more of the outbound interface(s) are trunk ports, then the VLAN ID is returned by the adjacency table 614. Next, the routing engine 608 retrieves the VLAN ID from VLAN table 616 associated with the interface on which the packet was received or from the message itself, in the case of a message received on a trunk port, as indicated at block 734.

Figure 7C:
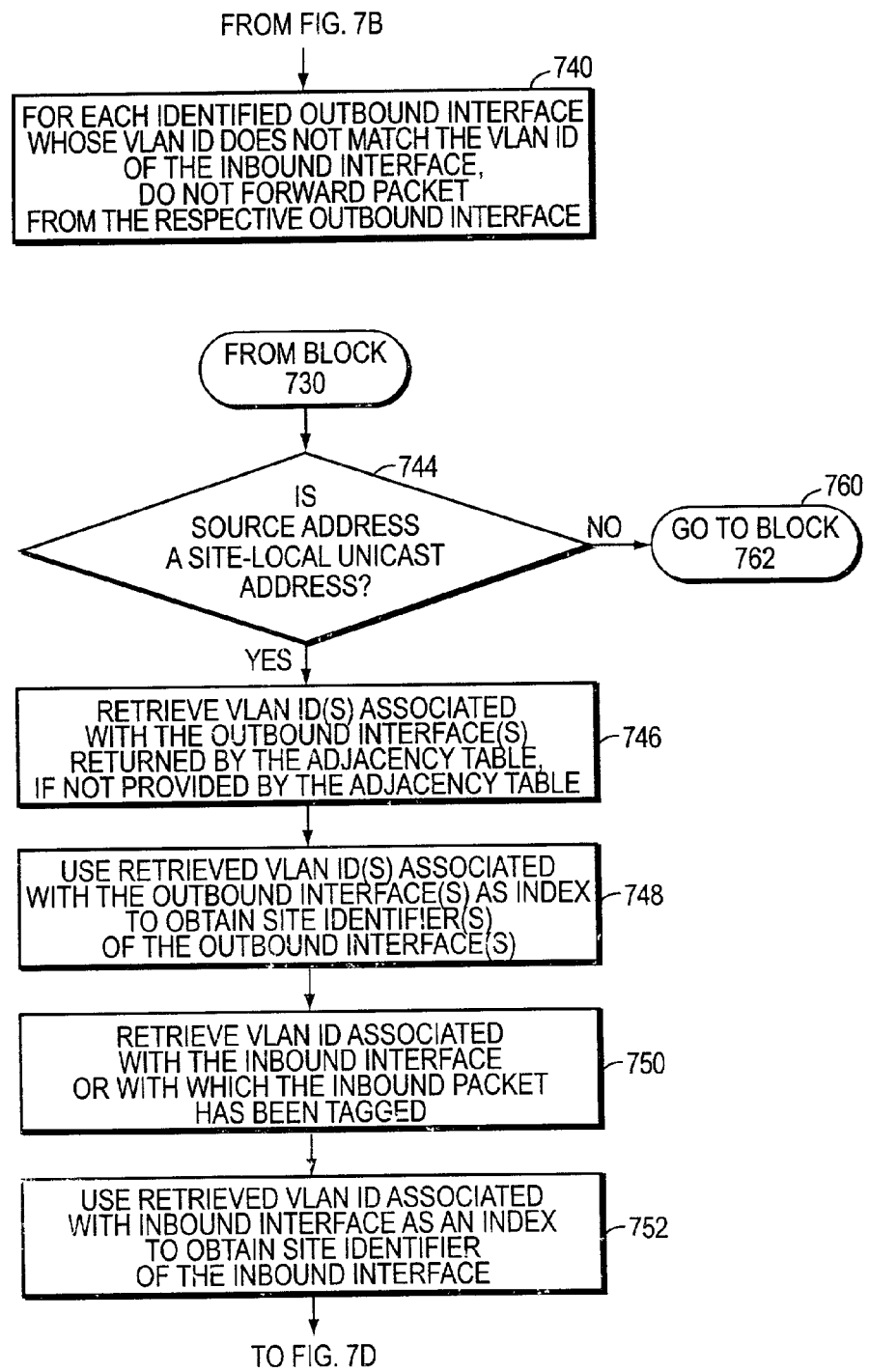

The routing engine then compares the VLAN ID associated with the inbound interface with the VLAN ID(s) associated with each of the outbound interface(s) and forwards the packet from those outbound interfaces whose VLAN ID matches that of the inbound interface. Specifically, for each outbound interface for which there is a match of VLAN IDs, the routing engine 608 passes the packet 100 and the information retrieved from the adjacency table 614 (such as the L2 address) to the outbound interface, as indicated at block 736. The packet 100 is then forwarded from the identified interface, i.e., port 502g, in a conventional manner, as indicated at block 738. For each identified outbound interface whose VLAN ID does not match the VLAN ID of the inbound interface, the routing engine 608 is specifically configured not to forward the packet 100, as indicated at block 740 (FIG. 7C). In this way, the routing engine enforces the limited scope of link-local unicast source addresses.

Returning to decision block 730 (FIG. 7B), if the packet's source address is not a link-local unicast address, the routing engine preferably determines whether it is a site-local unicast address, as indicated by jump block 742 leading to decision block 744 (FIG. 7C). If the source address is a site-local unicast address, the routing engine 608 obtains the VLAN ID(s) associated with the outbound interface(s) returned by the adjacency table 614, as indicated at block 746. The routing engine 608 then uses the VLAN ID retrieved for the outbound interface(s) as an index into site table 624 in order to obtain the site ID(s) for the outbound interface(s), as indicated at block 748. Next, the routing engine 608 retrieves the VLAN ID from VLAN table 616 associated with the interface on which the packet was received or from the message itself, in the case of a message received on a trunk port, as indicated at block 750. At block 752, the routing engine 608 obtains the site ID for the VLAN ID of the inbound interface from site table 624.

Figure 7D:
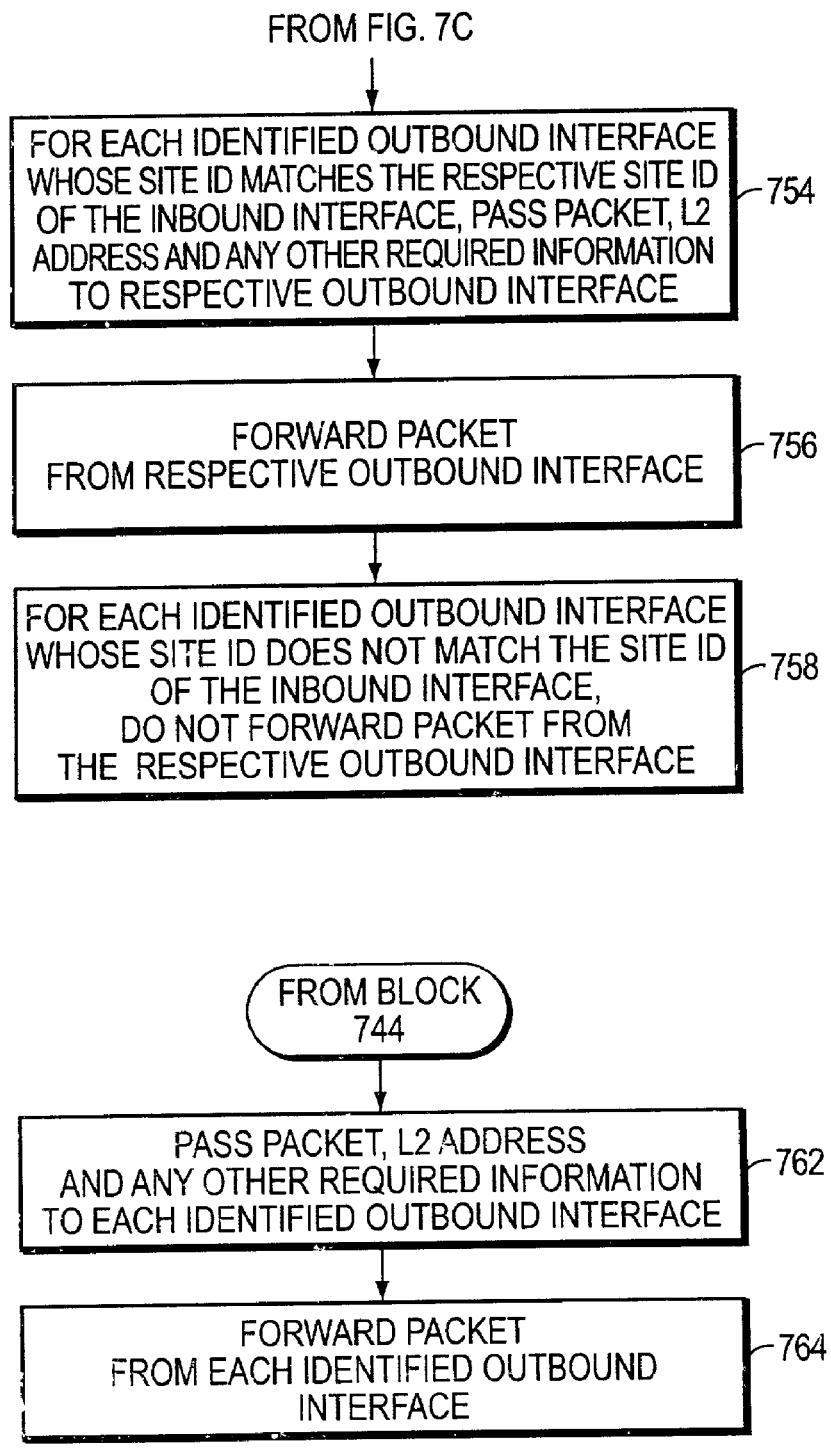

The routing engine then compares the site ID associated with the inbound interface with the site ID(s) associated with each of the outbound interface(s) and forwards the packet from those outbound interfaces whose site ID matches that of the inbound interface. Specifically, for each outbound interface for which there is a match of site IDs, the routing engine 608 passes the packet 100 and the information retrieved from the adjacency table 614 (such as the L2 address) to the outbound interface, as indicated at block 754 (FIG. 7D). The packet 100 is then forwarded from the identified interface, i.e., port 502g, in a conventional manner, as indicated at block 756. For each identified outbound interface whose site ID does not match the site ID of the inbound interface, the routing engine 608 is specifically configured not to forward the packet 100, as indicated at block 758. In this way, the routing engine enforces the limited scope of site-local unicast source addresses.

Returning to decision block 744 (FIG. 7C), if the source address is not a site-local unicast address (meaning that the source address is a global unicast IPv6 address), the routing engine simply forwards the packet 100 from each of the identified outbound interface(s). In particular, the routing engine 608 passes the packet 100 and the L2 address to the respective line card corresponding to each identified outbound interface, as indicated by jump block 760 (FIG. 7C) leading to block 762 (FIG. 7D). The packet 100 is then forwarded from each of the identified interface(s), in a conventional manner, as indicated at block 764.

It should be understood that if the destination address of the packet was a link-local or a site local unicast address, the routing engine may have already obtained the VLAN ID associated with the inbound interface at block 708 (FIG. 7A) and the site ID at block 712.

FIG. 13 is a partial block diagram of an intermediate network device 1300 illustrating another embodiment of the present invention. Device 1300 is similar to device 500 (FIG. 6) and like reference numerals refer to like components. Unlike device 500, however, device 1300 has a plurality of zone tables, such as zone tables 1302, 1304 and 1306. Each zone table, moreover, is preferably associated with a different scope value. For example, table 1302 corresponds to a scope value of hexadecimal "3", table 1304 corresponds to a scope value of hexadecimal "5", and table 1306 corresponds to a scope value of hexadecimal "B". It should be understood that device 1300 may include a zone table for every one of the eleven possible multicast non-global scopes, excluding node-local which is handled by the VLAN table 616. Nonetheless, device 1300 could alternatively have fewer zone tables.

With this embodiment, when an IPv6 packet having a multicast destination address is received, and the scope value is between hexadecimal "3" and "D", inclusive, the routing engine 608 first retrieves the VLAN ID associated with the inbound interface on which the packet was received or the VLAN ID with which the packet has been tagged, as described above. Next, engine 608 utilizes the value from the packet's scope field 406 (FIG. 4) to select the appropriate zone table. For example, if the scope value from field 406 is hexadecimal "5", engine 608 would select and access table 1304. If the scope value is hexadecimal "B", engine 608 would select and access table 1306 and so on. Engine 608 then utilizes the retrieved VLAN ID, e.g., red, as an index to the selected zone table, e.g., table 1304, to identify the correct zone ID value, i.e., "188". As described above, engine 608 then generates an encoded look-up address 1000 (FIG. 10) for application to the FIB 612. In the zone_ID field 1004, engine loads the identified zone ID value, i.e., "188". The look-up address is then applied to the FIB 612 to derive a forwarding decision as described above.

Zone table 1304 whose scope value is "5", i.e., site-local, preferably coincides with site table 624 (FIG. 6), and table 1304 is preferably utilized for both multicast addresses of scope "5" and for site-local unicast addresses.

The foregoing description has been directed to specific embodiments of this invention. It will be apparent, however, that other variations and modifications may be made to the described embodiments, with the attainment of some or all of their advantages. For example, the order of steps in the flow diagram may be altered and/or various steps may be combined. Therefore, it is an object of the appended claims to cover all such variations and modifications as come within the true spirit and scope of the invention.

What is claimed is:

1. A method for use by an intermediate network device having a plurality of interfaces for forwarding network packets among the interfaces, one or more of the interfaces being associated with one or more Virtual Local Area Network (VLAN) designations, the method comprising the steps of:

receiving on an inbound interface a packet having a multicast destination address specifying a scope value and a group identifier (ID) value;

identifying the VLAN designation associated with the received packet;

if the scope value specified in the multicast address is between hexadecimal "2" and "4" inclusive, creating a look-up address that includes the identified VLAN designation and the group ID value; and utilizing the look-up address to render a forwarding decision for the received packet.

2. The method of claim 1 further comprising the steps of:

mapping each VLAN designation to a site identifier;

if the scope value specified in the multicast destination address is between hexadecimal "5" and "D" inclusive, utilizing the identified VLAN designation to retrieve the site identifier to which the VLAN designation is mapped; and creating a look-up address that includes the retrieved site identifier and the group ID value.

3. The method of claim 2 wherein the received packet complies with version 6 of the Internet Protocol (IPv6) specification standard.

4. The method of claim 3 wherein the step of utilizing comprises the step of applying the generated look-up address to a memory structure that has been programmed with IPv6 addresses or address prefixes.

5. The method of claim 4 wherein the memory structure is a forwarding information base (FIB) configured to permit fast lookups.

6. The method of claim 3 wherein
the look-up address includes a message type flag, a zone_ID field, and a group ID field, and
the step of creating a look-up address comprises the step of loading the zone_ID field with one of the VLAN designation and site identifier.

7. The method of claim 6 wherein the zone_ID field of the look-up address is on the order of 12-bits in length.

8. The method of claim 6 wherein the zone_ID field is loaded with either the identified VLAN designation or the retrieved site identifier depending on the scope value specified by the multicast destination address.

9. The method of claim 2 further comprising the step of identifying one or more outbound interfaces from which the packet is to be forwarded.

10. The method of claim 9 wherein the packet further includes a link-local unicast source address, the method further comprising the steps of:

identifying the VLAN designations associated with each of the outbound interfaces from which the packet is to be forwarded;

comparing the VLAN designation associated with the packet with the VLAN designation associated with each of the identified outbound interfaces; and forwarding the packet only from those outbound interfaces whose VLAN designation matches the VLAN designation associated with the packet.

11. The method of claim 9 wherein the packet further includes a site-local unicast source address, the method further comprising the steps of:

identifying the VLAN designations associated with each of the outbound interfaces from which the packet is to be forwarded;

utilizing the VLAN designations identified for the outbound interfaces to retrieve a site ID for each outbound interface;

utilizing the VLAN designation associated with the received packet to retrieve the site identifier associated with the packet;

comparing the site identifier associated with the packet with the site identifier retrieved for each of the outbound interfaces; and forwarding the packet only from those outbound interfaces whose site identifier matches the site identifier associated with the packet.

12. The method of claim 5 wherein the FIB includes one or more content addressable memories (CAMs) and/or ternary content addressable memories (TCAMs).

13. The method of claim 12 wherein the one or more CAMs or TCAMs each has a plurality of rows and at least some of the rows are configured to store multicast destination addresses having a zone_ID.

14. The method of claim 1 wherein each VLAN designation is mapped to a single site identifier.

15. The method of claim 2 wherein the multicast address further includes a flags field that is included within the created look-up address.

16. An intermediate network device for forwarding packets within a computer network, the device comprising:

a plurality of interfaces for receiving and forwarding packets, one or more of the interfaces associated with one or more virtual local area network (VLAN) designations;

a forwarding information base (FIB) for storing routing information;

a routing engine in communicating relationship with the FIB, the routing engine configured to render forwarding decisions for received packets, based at least in part on the routing information in the FIB; and a memory in communicating relationship with the routing engine, the memory configured to store the VLAN designations associated with the device's interfaces, wherein the routing engine is configured, in response to receiving a packet having a multicast destination address specifying a scope value between hexadecimal "2" and "4", inclusive, and a group identifier (ID) value, to generate a look-up address that includes the VLAN designation associated with the multicast packet and the group ID value, and to utilize the look-up address to render a forwarding decision for the multicast packet.

17. The intermediate network device of claim 16 wherein
the memory is further configured to store a mapping of VLAN designations to site identifiers, and
in response to receiving a packet having a multicast destination address specifying a scope value between hexadecimal "5" and "D", inclusive, and a group identifier (ID) value, the routing engine is further configured to utilize the VLAN designation associated with the multicast packet to retrieve the site identifier mapped thereto from the memory, and to generate a look-up address that includes the retrieved site identifier and the group ID value.

18. The intermediate network device of claim 17 wherein the received packet complies with version 6 of the Internet Protocol (IPv6) specification standard.

19. The intermediate network device of claim 18 wherein the FIB includes one or more content addressable memories (CAMs) and/or ternary content addressable memories (TCAMs) programmed with a plurality of addresses or address prefixes.

20. The intermediate network device of claim 19 wherein
the look-up address generated for a packet having a multicast destination address has the following format:
a message type flag;
a zone_ID field;

a multicast flags field;
a multicast scope field; and
a multicast group ID field, and
one of the VLAN designation and site identifier is loaded into the zone_ID field.

21. The intermediate network device of claim 20 wherein, each row of the CAM and/or TCAM is on the order of 144-bits,
the message type flag is on the order of 1-bit,
zone_ID field is on the order of 12-bits,
the flags field is on the order of 4-bits,
the scope field is on the order of 4-bits, and
the group ID field is on the order 112-bits.

22. The intermediate network device of claim 19 wherein:
the look-up address generated for a packet having a link-local unicast destination address has the following format:
a message type flag;
a scope field;
a link_ID field;
a null field; and
an interface ID field.

23. The intermediate network device of claim 19 wherein:
the look-up address generated for a packet having a site-local unicast destination address has the following format:
a message type flag;
a scope field;
a site_ID field;
a null field;
a Site-Level Aggregation (SLA) field; and
an interface ID field.

24. The intermediate network device of claim 19 wherein:
the look-up address generated for a packet having a global unicast destination address has the following format:
a message type flag;
a scope field;
a network prefix field; and
an interface ID field.

25. An intermediate network device for forwarding packets within a computer network, the device comprising:
a plurality of interfaces for receiving and forwarding packets, one or more of the interfaces associated with one or more virtual local area network (VLAN) designations;
a forwarding information base (FIB) for storing routing information;
a routing engine in communicating relationship with the FIB, the routing engine configured to render forwarding decisions for received packets, based at least in part on the routing information in the FIB;
a VLAN table in communicating relationship with the routing engine, and configured to store the VLAN designations associated with the device's interfaces; and
a plurality of zone tables in communicating relationship with the routing table, each zone table storing a mapping of VLAN designations to zone identifiers (IDs),
wherein the routing engine is configured
(1) in response to receiving a packet having a multicast destination address specifying a scope value of hexadecimal "2", and a group identifier (ID) value, to generate a look-up address that includes the VLAN designation associated with the multicast packet and the group ID value, and to utilize the look-up address to render a forwarding decision for the multicast packet, and
(2) in response to receiving a packet having a multicast destination address specifying a scope value between hexadecimal "3" and "D", inclusive, and a group ID value to (i) retrieve the zone ID mapped to the VLAN designation by a specified one of the zone tables and (ii) generate a look-up address that includes the retrieved zone ID and the group ID value.

26. The intermediate network device of claim 25 wherein the multicast destination address includes a scope value,
each zone table is associated with a particular scope value, and
the specified one of the zone tables corresponds to the zone table whose associated scope value matches the scope value from the multicast destination address.

* * * * *